(12) United States Patent
Kim et al.

(10) Patent No.: US 9,337,482 B2
(45) Date of Patent: May 10, 2016

(54) COMPOSITE NITRIDE, METHOD OF PREPARING THE SAME, ELECTRODE ACTIVE MATERIAL INCLUDING THE COMPOSITE NITRIDE, ELECTRODE INCLUDING THE ELECTRODE ACTIVE MATERIAL, AND LITHIUM SECONDARY BATTERY INCLUDING THE ELECTRODE

(71) Applicants: Ryoung-hee Kim, Yongin-si (KR); Min-sang Song, Seongnam-si (KR); Gue-sung Kim, Yongin-si (KR); So-yeon Kim, Suwon-si (KR); Young-min Choi, Suwon-si (KR); Won-chang Choi, Yongin-si (KR)

(72) Inventors: Ryoung-hee Kim, Yongin-si (KR); Min-sang Song, Seongnam-si (KR); Gue-sung Kim, Yongin-si (KR); So-yeon Kim, Suwon-si (KR); Young-min Choi, Suwon-si (KR); Won-chang Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 414 days.

(21) Appl. No.: 13/688,469

(22) Filed: Nov. 29, 2012

(65) Prior Publication Data

US 2013/0136984 A1    May 30, 2013

(30) Foreign Application Priority Data

Nov. 29, 2011    (KR) .................. 10-2011-0126280

(51) Int. Cl.
*H01M 4/36*  (2006.01)
*H01M 4/04*  (2006.01)
*H01M 4/131*  (2010.01)
*H01M 4/136*  (2010.01)

(Continued)

(52) U.S. Cl.
CPC .............. *H01M 4/366* (2013.01); *B82Y 30/00* (2013.01); *C01B 21/0821* (2013.01); *C01G 23/005* (2013.01); *C01G 23/053* (2013.01); *H01M 4/0471* (2013.01); *H01M 4/131* (2013.01); *H01M 4/136* (2013.01); *H01M 4/1391* (2013.01); *H01M 4/1397* (2013.01); *H01M 4/485* (2013.01); *H01M 4/58* (2013.01); *C01P 2002/72* (2013.01); *C01P 2002/85* (2013.01); *C01P 2004/16* (2013.01); *C01P 2004/61* (2013.01); *C01P 2004/62* (2013.01); *C01P 2004/64* (2013.01); *C01P 2006/40* (2013.01); *Y02E 60/122* (2013.01)

(58) Field of Classification Search
CPC .............................. H01M 4/362; H01M 4/366
USPC ................................... 429/219, 220; 427/123
See application file for complete search history.

(56) References Cited

U.S. PATENT DOCUMENTS

2005/0281727 A1*  12/2005  Yoshizawa et al. ........... 423/385
2006/0199729 A1*   9/2006  Naganuma et al. ........... 502/228

(Continued)

FOREIGN PATENT DOCUMENTS

JP    2008-117625 A    5/2008
JP    2010-040480 A    2/2010

*Primary Examiner* — Stewart Fraser
(74) *Attorney, Agent, or Firm* — Lee & Morse, P.C.

(57) ABSTRACT

A composite nitride, a method of preparing the composite nitride, an electrode active material including the composite nitride, an electrode including the electrode active material, and a lithium secondary battery including the electrode, the composite nitride including a core material including a bronze-phase titanium oxide; and a nitrogen atom doped on at least part of the core material.

20 Claims, 9 Drawing Sheets

(51) Int. Cl.
*H01M 4/1391* (2010.01)
*H01M 4/1397* (2010.01)
*H01M 4/485* (2010.01)
*H01M 4/58* (2010.01)
*C01B 21/082* (2006.01)
*B82Y 30/00* (2011.01)
*C01G 23/00* (2006.01)
*C01G 23/053* (2006.01)

(56) References Cited

U.S. PATENT DOCUMENTS

| | | | |
|---|---|---|---|
| 2007/0292760 | A1 | 12/2007 | Patoux et al. |
| 2009/0208847 | A1 | 8/2009 | Kang |
| 2010/0092846 | A1* | 4/2010 | Inagaki et al. .................. 429/92 |
| 2010/0178560 | A1 | 7/2010 | Kim et al. |
| 2012/0049126 | A1* | 3/2012 | Park et al. ..................... 252/506 |

* cited by examiner

COMPOSITE NITRIDE, METHOD OF PREPARING THE SAME, ELECTRODE ACTIVE MATERIAL INCLUDING THE COMPOSITE NITRIDE, ELECTRODE INCLUDING THE ELECTRODE ACTIVE MATERIAL, AND LITHIUM SECONDARY BATTERY INCLUDING THE ELECTRODE

BACKGROUND

1. Field

Embodiments relate to a composite nitride, a method of preparing the composite nitride, an electrode active material including the composite nitride, an electrode including the electrode active material, and a lithium secondary battery including the electrode.

2. Description of the Related Art

Recently, lithium batteries have drawn significant attention as power sources for small portable electronic devices. Lithium batteries that use an organic electrolytic solution have a discharge voltage that is about twice as high as those that use an aqueous alkali solution as an electrolyte and a higher energy density than those that use aqueous alkali solution as an electrolyte.

Lithium batteries include negative and positive electrodes, each including an active material that allows intercalation and deintercalation of lithium ions, and an organic electrolyte or a polymer electrolyte filling the gap between the negative and positive electrodes. Lithium batteries produce electrical energy from redox reactions that take place as lithium ions are intercalated into or deintercalated from the positive and negative electrodes.

As negative active materials of the lithium secondary battery, graphite, high-capacity silicon-based transition metal oxides, tin-based transition metal oxides, and the like may be used.

SUMMARY

Embodiments are directed to a composite nitride, a method of preparing the composite nitride, an electrode active material including the composite nitride, an electrode including the electrode active material, and a lithium secondary battery including the electrode.

Provided are a composite nitride and a method of preparing the same.

Provided are an electrode active material including the composite nitride, an electrode including the electrode active material, and a lithium secondary battery with improved lifetime and high-rate characteristics due to using the electrode.

Additional aspects will be set forth in part in the description which follows and, in part, will be apparent from the description, or may be learned by practice of the presented embodiments.

According to an aspect of the present disclosure, a composite nitride includes: a core material including a bronze-phase titanium oxide; and a nitrogen atom doped on at least part of the core material.

According to another aspect of the present disclosure, a method of preparing a composite nitride includes thermally treating a core material including a bronze-phase titanium oxide in contact with a nitrogen precursor gas at a temperature of 500° C. or less.

In the method, the core material further may include a lithium titanium oxide, and the core material may be a composite material of the bronze-phase titanium oxide and the lithium titanium oxide.

In the method, preparation of the composite material of the bronze-phase titanium nitride and the lithium titanium oxide may include mixing the bronze-phase titanium nitride and the lithium titanium oxide to obtain a mixture; and thermally treating the mixture.

According to another aspect of the present disclosure, there is provided an electrode active material including the above-described composite nitride.

According to still another aspect of the present disclosure, there is provided an electrode including the electrode active material.

According to yet still another aspect of the present disclosure, there is provided a lithium secondary battery including the electrode.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1A:
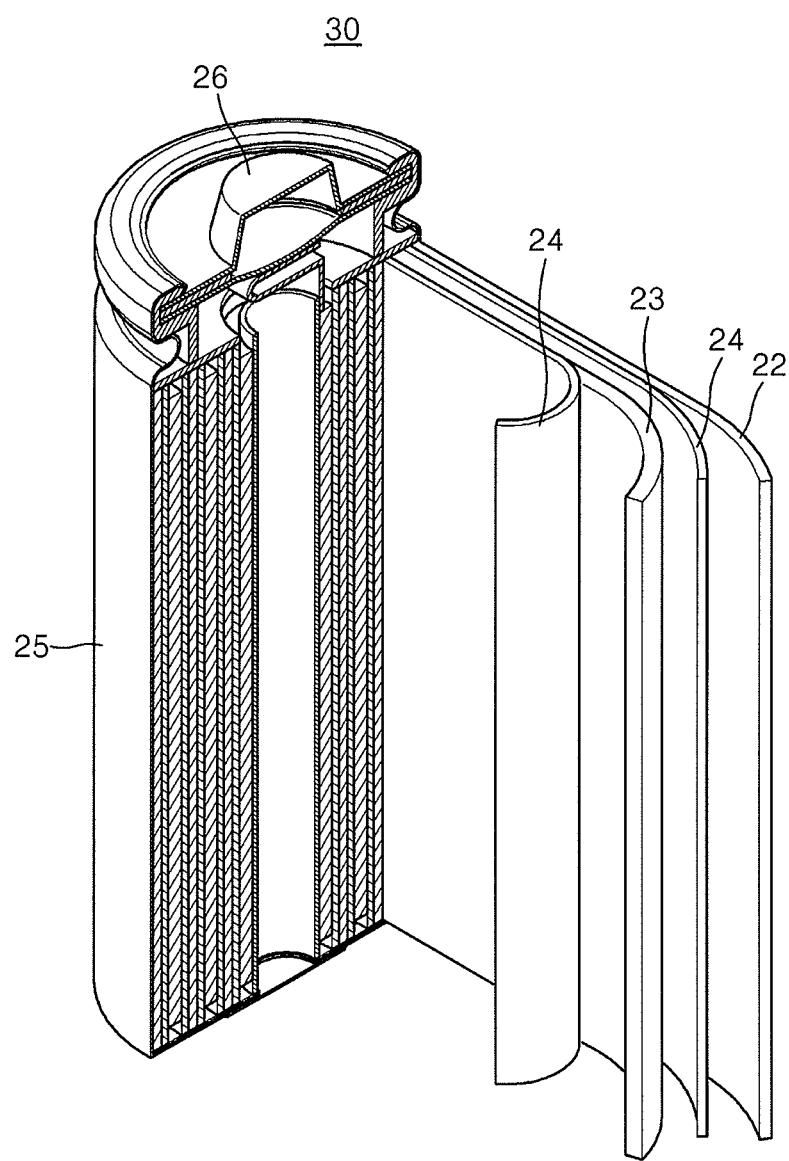
FIG. 1A illustrates a schematic view of a structure of a lithium secondary battery according to an embodiment.

Korean Patent Application No. 10-2011-0126280, filed on Nov. 29, 2011, in the Korean Intellectual Property Office, and entitled: "Composite Nitride, Method of Preparing Same, Electrode Active Material Including Same, Electrode Including the Material, and Lithium Secondary Battery Including the Electrode," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

According to an embodiment, there is provided a composite nitride that includes: a core material including a bronze-phase titanium oxide; and a nitrogen atom doped on at least part of the core material.

The core material may further include a lithium titanium oxide (LTO), and thus, may be a composite material of the bronze-phase titanium oxide and the LTO.

According to embodiments, the nitrogen atom doped on at least part of the core material may facilitate migration of lithium in the composite nitride, thus improving conductivity of the composite nitride. A lithium secondary battery employing an electrode active material including the composite nitride may have improved lifetime and high-rate characteristics.

An electrode formed using an LTO (e.g., $Li_4Ti_5O_{12}$) as an electrode active material without a conducting agent may have similar charge/discharge characteristics to those of an electrode formed using a conducting agent. This indicates that the LTO may have characteristics of both an active material and a conducting agent. In consideration of the nature of LTO as an insulator, the function of LTO as a conducting agent may help improve operations of a secondary battery.

As described above, an LTO is a material that functions both as an active material and conducting agent, and thus, may achieve similar charge/discharge characteristics, as those when using a conducting agent, without use of a conducting agent.

This nature of the LTO may be explained as follows.

An LTO, e.g., $Li_4Ti_5O_{12}$, may serve as an insulator before charging and discharging. However, a two-phase equilibrium ($Li_4Ti_5O_{12} \leftrightarrows Li_7Ti_5O_{12}$) reached during lithium intercalation may lead to a constant intercalation/deintercalation potential relative to that of a $Li^+/Li$ pair, thus resulting in a sufficient electron conductivity as charging and discharging proceed. An LTO pair $Li_4Ti_5O_{12}/Li_7Ti_5O_{12}$ has a lithium intercalation/deintercalation potential of about 1.5 V. This potential level may avoid the risk of dendrite formation. Also, $Li_4Ti_5O_{12}$ is chemically and thermally stable, nontoxic, and has a high electrochemical efficiency. Inclusion of such LTOs may help ensure a charge/discharge voltage of about 1.5 V and better stability as compared with use of graphite-based materials. Further, since undergoing nearly no change in lattice constant during lithium intercalation and deintercalation, LTOs may be advantageous in terms of reversibility and lifetime characteristics.

Bronze-phase titanium oxide is a metastable monoclinic material of titanium oxide, and, unlike anatase titanium oxide and rutile titanium oxide, may have a charge/discharge voltage of about 1.6 V, a high capacity of about 250 mAh/g, and a low-density characteristic of about 3.73 g/cc. When used as an electrode active material, the bronze-phase titanium oxide may provide an electrode with high capacity characteristics. However, low conductivity and slow kinetic properties associated with intercalation/deintercalation of lithium are not satisfactorily high enough to improve lifetime characteristics of the electrode using the bronze-phase titanium oxide.

To improve the conductivity and kinetic properties of the bronze-phase titanium oxide, increasing an amount of a conducting agent has been considered. With use of this method, conductivity of an electrode including the bronze-phase titanium oxide as an electrode active material and lifetime characteristics of a lithium battery including the electrode may be improved. However, a reduced amount of the bronze-phase titanium oxide used as an active material in the electrode relative to the amount of the conducing agent may lead to a reduced energy density of the electrode.

Accordingly, the embodiments provide a composite nitride prepared by incorporating a nitrogen atom into at least part of a bronze-phase titanium oxide, or a composite nitride prepared by mixing an LTO that serves both as an active material and conducting agent with a bronze-phase titanium oxide to obtain a composite material, and incorporating a nitrogen atom into at least part of the bronze-phase titanium oxide in the composite material. In these composite nitrides, the LTO (with satisfactory lifetime and high-rate characteristics) may serve both as an active material and conducting agent, and thus may help improve conductivity and lifetime of the electrode using the bronze-phase titanium oxide. Further, the bronze-phase titanium oxide may help improve the capacity of the electrode using the LTO without distorting charging/discharging curves of the LTO. The nitrogen atom doped on at least part of the core material may facilitate migration of lithium in the composite nitride, thus improving conductivity of the composite nitride. A lithium secondary battery employing an electrode active material including the composite nitride may have improved lifetime and high-rate characteristics.

The electrode active material may be, for example, a negative active material.

In some embodiments, in doping the core material with the nitrogen atom, the core material may be in contact with a nitrogen precursor gas for a predetermined time and then be thermally treated at about 500° C. or less.

In some embodiments the core material may include a bronze-phase titanium oxide or may be a composite material of a bronze-phase titanium oxide and an LTO.

When the core material is in contact with the nitrogen precursor gas, a nitrogen atom originating from the nitrogen precursor gas may diffuse into the core material, being doped to a predetermined doping depth. For example, the doping depth may be about 500 nm or less, and in some embodiments, may be about 100 nm.

In the composite nitride, the nitrogen atom doped on at least part of the core material may have a concentration gradient with decreasing concentration from a surface of the core material toward a center of the core material. For example, the farther from the center of the core material, the higher the concentration of the doped nitrogen atom may be, and the closer to the center of the core material, the lower the concentration of the doped nitrogen atom may be.

Due to the inclusion of the bronze-phase titanium oxide, an X-ray diffraction spectrum of the composite nitride with a CuK-α X-ray wavelength of 1.541 Å may have a main peak with a Bragg angle 2θ of from about 23° to about 27°. In some embodiments the main peak may have a Bragg angle 2θ of from about 24° to about 26°, and in some other embodiments, may have a Bragg angle 2θ of from about 24.3° to about 25.8°.

An X-ray photoelectron spectrum (XPS) of the composite nitride may have a nitrogen peak with a binding energy of from about 397 eV to about 402 eV and a titanium peak with a binding energy of from about 457 eV to about 461 eV and from about 463 eV to about 467 eV. A composition ratio of nitrogen to titanium that is calculated from the areas of the nitrogen peak with a binding energy of from about 397 eV to about 402 eV and the titanium peak with a binding energy of from about 457 eV to about 461 eV may be from about 1:220 to about 1:350.

The nitrogen peak represents a binding energy of nitrogen in the 1s orbital, indicating the presence of the nitrogen atom doped in the composite nitride. The titanium peak represents a binding energy of titanium in the 2p orbital, indicating the presence of titanium in the composite nitride.

The composition ratio of nitrogen to titanium calculated from the areas of the nitrogen and titanium peaks may be from about 1:135 to about 1:220, and in some embodiments, may be about 1:170, indicating that an atomic ratio of nitrogen to titanium may be from about 1:40 to about 1:65. For example, the composite nitride may include about 40 to 65 nitrogen atoms per titanium atom.

An XPS of the composite nitride may have a nitrogen peak with a binding energy of from about 397 eV to about 402 eV, and an oxygen peak with a binding energy of from about 529 eV to about 532 eV. A composition ratio of nitrogen to oxygen that is calculated from the areas of the nitrogen peak and the oxygen peak may be from about 1:140 to about 1:150.

The oxygen peak represents a binding energy of oxygen (O) in the 1s orbital, indicating the presence of the oxygen atom in the composite nitride.

The composition ratio of nitrogen to oxygen calculated from the areas of the nitrogen and oxygen peaks may be from about 1:140 to about 1:150, indicating that an atomic ratio of nitrogen to oxygen may be from about 1:125 to about 1:135.

An average doping depth of the nitrogen atom doped on the composite nitride may be about 50% or less of an average particle diameter of the composite nitride. For example, the average doping depth of the nitrogen atom may be about 30% or less of the average particle diameter of the composite nitride, and in some embodiments, may be about 15% or less of the average particle diameter of the composite nitride. When the average doping depth of the nitrogen atom is within these ranges, improved high-rate characteristics may be attainable.

An XPS of the composite nitride may have a carbon peak with a binding energy of from about 283 eV to about 288 eV. This carbon peak may be from impurities derived from a starter material used in preparing the bronze-phase titanium oxide.

The composite nitride including a bronze-phase titanium oxide as the core material may be a compound represented by Formula 1, below.

$$TiO_xN_yH_z \qquad \text{[Formula 1]}$$

In Formula 1, $1.0 \leq x \leq 2.0$, $0 \leq y \leq 1.0$, and $0 \leq z \leq 1.0$.

In Formula 1, x may be about 1.8 to about 2.0, and in some embodiments, may be 1.9.

y may be from about 0.001 to about 0.1, and in some embodiments, may be about 0.05. z may be from about 0.0 to about 0.1, and in some embodiments, may be about 0.05.

The composite nitride may be, e.g., $TiO_xN_yH_z$ (x=1.98, y=0.01, and z=0.01) or $TiO_xN_yH_z$ (x=1.99, y=0.01, and z=0).

The composite nitride may have an average particle diameter of from about 1 nm to about 2,000 nm, and in some embodiments, may have an average particle diameter of from about 300 nm to about 500 nm.

The composite nitride may be in particulate powder form. When the average particle diameter of the composite nitride is within these ranges, a lithium secondary battery employing the composite nitride as an electrode active material may have improved lifetime and high-rate characteristics without a decrease in capacity.

In some embodiments the bronze-phase titanium oxide may be a compound represented by Formula 2, below.

$$Ti_{1+x}O_{2+y} \qquad \text{[Formula 2]}$$

In Formula 2 above, $-0.2 \leq x \leq 0.2$ and $-0.2 \leq y \leq 0.2$.
The compound of Formula 2 may be, e.g., $TiO_2$.

In some embodiments the core material may be a composite material of an LTO and a bronze-phase titanium oxide, as described above. At least part of the composite material may be doped with nitrogen atom in the composite nitride.

The LTO may be a compound represented by Formula 4, below.

$$Li_{4+a}Ti_{5-b}M_cO_{12-d} \qquad \text{[Formula 4]}$$

In Formula 4 above, $-0.2 \leq a \leq 0.2$, $-0.3 \leq b \leq 0.3$, $0 \leq c \leq 0.3$, and $-0.3 \leq d \leq 0.3$; and M may be at least one selected from among metals of Groups 1-6, Group 8, and Groups 12-15 of the periodic table of elements.

M in Formula 1 may be at least one selected from the group of lithium (Li), sodium (Na), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As).

The compound of Formula 4 may have a spinel structure, and may be, e.g., $Li_4Ti_5O_{12}$.

The composite material of the LTO and the bronze-phase titanium oxide may be a material obtained by complexation of the LTO and the bronze-phase titanium oxide.

In some embodiments, the composite nitride including a composite material of the LTO and bronze-phase titanium oxide as the core material may be a compound represented by Formula 3, below.

$$Li_xTiO_yN_zH_u \qquad \text{[Formula 3]}$$

In Formula 3, $0 \leq x \leq 2.0$, $1.0 \leq y \leq 2.5$, $0 \leq z \leq 1.0$, and $0 \leq u \leq 1.0$.

x may be from 0.3 to 0.4, and in some embodiments, may be about 0.33.

y may be from about 2.1 to about 2.4, and in some embodiments, may be about 2.23. z may be from about 0.001 to about 0.1, and in some embodiments, may be about 0.05. u may be from about 0.0 to about 0.1, and in some embodiments, may be about 0.05.

In some embodiments the composite nitride may be $Li_xTiO_yN_zH_u$ (x=0.33, y=2.23, z=0.05, and u=0.05) or $Li_xTiO_yN_zH_u$ (x=0.33, y=2.32, z=0.01, and u=0). For example, when the LTO of Formula 4 is $Li_4Ti_5O_{12}$, this LTO may serve as an insulator before discharging. However, a two-phase equilibrium ($Li_4Ti_5O_{12} \leftrightarrows Li_7Ti_5O_{12}$) reached during lithium intercalation may lead to a constant intercalation/deintercalation potential relative to that of a $Li^+/Li$ pair, thus resulting in a sufficient electron conductivity as charging and discharging proceed. An LTO pair $Li_4Ti_5O_{12}/Li_7Ti_5O_{12}$ has a lithium intercalation/deintercalation potential of about 1.5 V. This potential level may avoid the risk of dendrite formation. Also, $Li_4Ti_5O_{12}$ is chemically and thermally stable, nontoxic, and has a high electrochemical efficiency. Inclusion of such LTOs ensures a charge/discharge voltage of about 1.5 V and better stability as compared with use of graphite-based materials. Further, since undergoing nearly no change in lattice constant during lithium intercalation and deintercalation, LTOs are advantageous in terms of reversibility and lifetime characteristics.

Therefore, due to the use of the complex material of the LTO and bronze-phase titanium oxide in the composite nitride, the LTO may help improve the lifespan of the bronze-phase titanium oxide, while the bronze-phase titanium oxide may help improve the capacity of the LTO without a distortion in charging/discharging curves of the LTO. As a result, the composite nitride may help improve active material capacity characteristics per weight, an electrode including the composite nitride may have a high active mass density, and the electrode may have an improved discharge capacity per electrode volume and an improved energy density. Using this electrode, a lithium secondary battery with improvement in capacity characteristics and high-rate discharge and lifetime characteristics may be manufactured.

In either the composite material or the composite nitride, an amount of the LTO may be from about 0.01 moles to about 99 moles, and in some embodiments, may be from about 0.01 moles to about 10.0 moles, and in some other embodiments, may be from about 0.01 to about 2.0 moles, and in still other embodiments, may be from about 0.03 moles to about 2.0 moles, and in yet other embodiments, may be from about 0.26 moles to about 1.57 moles, and in further yet other embodiments, may be from about 0.26 moles to about 1.0 mole, based on 1 mole of the bronze-phase titanium oxide.

When the amount of the LTO is within these ranges, the composite material and the composite nitride may have improvement in capacity characteristics and high-rate characteristics, and in particular, in terms of high-rate discharge characteristics and lifetime characteristics.

In the composite material and the composite nitride, an atomic ratio of lithium to titanium, which is represented by x/y (where x represents an atomic percent of Li, and y represents an atomic percent of Ti), may be from about 0.3 to about 1.8, and in some other embodiments, may be from about 0.3 to about 1.4. The atomic ratio of Li to Ti may be from about 0.6 to about 0.8, and in some other embodiments, may be from about 0.75 to about 0.79. The Li/Ti atomic ratio may be measured using inductively coupled plasma (ICP).

The compositions of the composite material and composite nitride may be identified through X-ray diffraction analysis using a CuK-α X-ray wavelength of 1.541 Å.

X-ray diffraction spectra of the composite material and composite nitride may have an LTO-related main peak with a Bragg angle 2θ of from about 17° to about 19°, e.g., with a Bragg angle 2θ of from about 18° to about 19°.

The LTO-related main peak may appear at a Bragg angle 2θ of from about 35° to about 36.5°, e.g., from about 42° to about 44°.

A bronze-phase titanium oxide-related main peak may appear at a Bragg angle 2θ of from about 23° to about 27°, and in some embodiments, from about 24° to about 26°, and in some other embodiments, from about 24.3° to about 25.8°.

The bronze-phase titanium oxide-related peak may appear at a Bragg angle 2θ of from about 42° to about 46° and of from about 47° to about 49°.

In some embodiments, the LTO-related peaks may appear at a Bragg angle 2θ of from about 8.0 to about 18.5° (relative intensity: 100%), from about 35 to about 36° (relative intensity: 45%), and from about 43.0° to about 46.5° (relative intensity: 62%).

In some embodiments, the bronze-phase titanium oxide-related peaks may appear at a Bragg angle 2θ of from about 14.0° to about 14.5° (relative intensity: 60%), at from about 24.5° to about 25.5° (relative intensity: 100%), and at from about 28.5° to about 29.0° (relative intensity: 51%).

An intensity ratio of the bronze-phase titanium oxide ($TiO_2$—B) main peak (2θ=23~27° to the LTO main peak) (2θ=17~19° may be from about 0.03 to about 2, and in some embodiments, may be from about 0.03 to about 1, and in some other embodiments, may be from about 0.037 to about 0.097.

A peak intensity refers to the intensity of a peak with almost zero intensities at peak start and end points after removal of background intensity.

The bronze-phase titanium oxide may be in the form of at least one of nanowires, rods, and particles. Using the bronze-phase titanium oxide, the composite material and composite nitride as final products may also have a shape of nanowires, rods, or particles.

Hereinafter, a method of preparing the composite nitride, according to an embodiment of the present disclosure, is described.

First, doping the core material including the bronze-phase titanium oxide with nitrogen atom may be performed. For example, the core material may be in contact with a nitrogen precursor gas at high temperatures for a predetermined time, and then be thermally treated at about 500° C. or less.

The nitrogen precursor gas may be ammonia gas, but is not limited thereto. Any of a variety of nitrogen source gases that are common in the art may be usable. Non-limiting examples of the nitrogen precursor gas may include urea, methylamine, and ethylamine.

The thermal treatment may be performed at a temperature of about 300 to about 400° C. If the thermal treatment temperature is over 500° C., the bronze-phase titanium oxide of the core material may be changed into anatase titanium oxide, thus not able to form a target product.

The thermal treatment time may depend on the thermal treatment temperature. The thermal treatment time may be less than about 100 hours, and in some embodiments, may be from about 10 minutes to about 300 minutes. When the thermal treatment temperature and duration are within these ranges, the resultant composite nitride may be effectively usable as an electrode active material for a lithium secondary battery with further improved high-rate and lifetime characteristics.

The core material may be a composite material of the bronze-phase titanium oxide and an LTO.

When the core material is in contact with the nitrogen precursor gas, a nitrogen atom originating from the nitrogen precursor gas may diffuse into the core material, thereby being doped to a predetermined doping depth. The doping depth may be from about 1 nm to about 200 nm, and in some embodiments, may be about 10 nm.

The nitrogen precursor gas may be ammonia gas, but is not limited thereto. Any of a variety of nitrogen source gases that are common in the art may be usable. Non-limiting examples of the nitrogen precursor gas may include urea, methylamine, and ethylamine.

If the thermal treatment temperature is over 500° C., the bronze-phase titanium oxide of the core material may be changed into anatase titanium oxide, and thus may not be able to form a target product.

The thermal treatment may be performed at a temperature of about 300 to about 400° C.

The thermal treatment time may depend on the thermal treatment temperature. The thermal treatment time may be less than about 100 hours, and in some embodiments, may be from about 10 minutes to about 300 minutes. When the thermal treatment temperature and duration are within these ranges, the resultant composite nitride may be effectively usable as an electrode active material for a lithium secondary battery with further improved high-rate and lifetime characteristics.

A method of preparing a composite material of a bronze-phase titanium oxide and an LTO as a core material of the composite nitride, according to an embodiment, will now be described below.

First, mixing the LTO and the bronze-phase titanium oxide together may be performed to obtain a mixture.

The mixing may be performed using, e.g., a ball mill, a banbury mixer, or a homogenizer.

The mixing time may vary, e.g., may be from about 20 minutes to about 10 hours, and in some other embodiments, may be from about 30 minutes to about 3 hours.

During the mixing, an alcoholic solvent such as ethanol may be added to increase mixing efficiency.

Next, thermally treating the mixture may be performed to obtain the composite material.

The thermal treating may be performed under an inert gas or oxidizing gas atmosphere.

When the thermal treating is performed, e.g., under an oxidizing gas atmosphere, reduction of the composite material may be prevented.

The thermal treating may be performed at a temperature of about 250 to 450° C., and in some embodiments, may be performed at a temperature of about 300 to about 400° C. The thermal treatment time may depend on the thermal treatment temperature. In some embodiments the thermal treatment time may be from about 3 hours to about 7 hours.

When the thermal treatment time and temperature are within these ranges, the resultant composite material may have improved lifetime and capacity characteristics without a decrease in stability.

The LTO may have an average particle diameter (D50) of from about 0.1 μm to about 30 μm, and in some embodiments, may have an average particle diameter (D50) of from about 0.1 μm to about 1 μm, and in some other embodiments, may have an average particle diameter (D50) of about 0.685 μm. When the average particle diameter (D50) of the LTO is within these ranges, a negative active material composition that includes the LTO may have an increased surface area ratio of conducting agent to negative active material, and thus, may lead to an increased electrode conductivity and improved high-rate discharge characteristics.

The bronze-phase titanium oxide in the composite material may have an average particle diameter (D50) of from about 0.01 μm to about 5 μm.

The term "average particle diameter (D50)" used herein may refer to a cumulative particle diameter at 50% of a total cumulative volume distribution of a particulate powder, which is a volumetric average particle diameter as measured by a wet laser method using a laser type particle size distribution measuring apparatus (MICROTRACK HRA, available from Nikkiso Co., Ltd.).

An average particle diameter (D10) of the LTO may be from about 0.1 μm to about 30 μm, and in some embodiments, may be about 0.427 μm. An average particle diameter (D90) of the LTO may be from about 0.1 μm to about 30 μM, and in some embodiments, may be about 1.196 μm. An average particle diameter (D99.9) of the LTO may be from about 0.1 μm to about 30 μm, and in some embodiments, may be about 1.923 μm.

The terms "average particle diameter (D10), average particle diameter (D90), and average particle diameter (D99.9)" refer to cumulative particle diameters at 10%, 90%, and 99.9%, respectively, of a total cumulative volume distribution of LTO particles, which may be measured using a laser type particle size distribution measuring apparatus as described above in conjunction with the average particle diameter (D50).

The LTO may be prepared using any suitable method, e.g., according to the following processes.

First, a lithium salt and a titanium precursor may be mixed together to obtain a mixture, which may then be thermally treated to obtain an LTO.

A mixing ratio of the lithium salt to titanium precursor may be appropriately adjusted so as to obtain an LTO of Formula 1 above. In some embodiments, the amount of the titanium precursor may be from about 0.9 moles to about 2.5 moles, based on 1 mole of the lithium salt.

The mixing may be mechanically performed using, for example, a ball mill, a banbury mixer, or a homogenizer.

The mechanical mixing time may vary, for example, may be from about 20 minutes to about 10 hours, and in some other embodiments, may be from about 30 minutes to about 3 hours.

During the mechanical mixing an alcoholic solvent such as ethanol may be added to increase mixing efficiency.

Next, the mixture of the lithium salt and titanium precursor may be thermally treated in the air or in an oxygen atmosphere at a temperature of from about 400° C. to about 1,000° C., and in some embodiments, from about 650° C. to about 900° C.

The thermal treatment time may depend on the thermal treatment temperature. In some embodiments the thermal treatment time may be from about 3 hours to about 7 hours.

When the thermal treatment time and temperature are within these ranges, the target LTO may be attainable.

Non-limiting examples of the lithium salt may include lithium carbonate ($Li_2CO_3$), lithium sulfate ($Li_2SO_4$), lithium nitrate ($LiNO_3$), and lithium hydroxide (LiOH).

Non-limiting examples of the titanium precursor may include titanium oxide ($TiO_2$) and titanium hydroxide ($Ti(OH)_4$).

When titanium oxide is used as the titanium precursor, an average particle diameter of the titanium oxide is not specifically limited, but may be, for example, from about 50 nm to about 500 nm.

The bronze-phase titanium oxide may be prepared using any suitable method, e.g., according to the following processes.

First, an aqueous sodium hydroxide solution and anatase $TiO_2$ power may be placed in an autoclave, and may then be subjected to hydrothermal synthesis reaction.

The aqueous sodium hydroxide solution may be prepared using deionized water. A concentration of the aqueous sodium hydroxide solution may be from about 10M to about 18M, and in some embodiments, may be about 15 M.

The hydrothermal synthesis reaction may be performed at a temperature of from about 150° C. to about 180° C., and in some embodiments, at about 170° C. The hydrothermal synthesis reaction time, which though may depend on the reaction temperature, may be about 72 hours. As a result of the hydrothermal synthesis, sodium titanate ($Na_2Ti_3O_7$) may be obtained.

Next, the sodium titanate may be subjected to proton exchange reaction to obtain sodium titanate, which may then be thermally treated under an air or an oxygen atmosphere to obtain a target bronze-phase titanium oxide.

The thermal treatment may be performed at a temperature of about 300 to 400° C., and the thermal treatment time may be from about 3 hours to 7 hours.

The proton exchange reaction of the sodium titanate may occur in an acid solution with stirring. The stirring may be performed for about 3 hours or longer, and in some embodiments, for from about 3 hours to about 24 hours. The stirring may be performed at varying temperatures, beginning at from room temperature gradually to high temperature.

The high temperature may be from about 45° C. to about 70° C., and in some embodiments, may be about 60° C. Such high temperatures may be conducive to facilitating the proton exchange reaction.

The acid solution may be a hydrochloric acid solution or nitric acid solution. A concentration of the acid solution may be, for example, about 1 M.

The bronze-phase titanium oxide may be in the form of at least one of nanowires, rods, and particles.

The bronze-phase titanium oxide may be used, for example, in the form of nanowires.

The nanowires may have a length of about 1 µm to about 15 µm, and a diameter of about 10 nm to about 200 nm. Using the bronze-phase titanium oxide in the form of nanowires within these dimension ranges may help reduce Li diffusion distance, thus facilitating diffusion of Li.

When the bronze-phase titanium oxide is in nanoparticle form, an average particle diameter (D50) of the bronze-phase titanium oxide may be from about 0.01 µm to about 5 µm.

In some embodiments, the composite material may be used as a negative active material for a large power-storage cell or as a sensor material.

According to an embodiment of the present disclosure, there is provided an electrode active material including the above-described composite material. The electrode may be, for example, a negative electrode.

The negative electrode may include a binder, in addition to the above-described negative active material.

The binder facilitates binding between the negative active material and a conducting agent, and binding of the negative active material to the current collector. The amount of the binder may be from about 1 to about 50 parts by weight, for example, about 2 parts to about 5 parts by weight, based on 100 parts by weight of a total weight of the negative active material. Examples of the binder may include polyvinylidene fluoride (PVDF), polyvinyl alcohols, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoro rubber, and various copolymers.

When the amount of the binder is within this range, the negative active material layer may bind strongly to the current collector.

The negative electrode may include a conducting agent.

When being used as a negative active material, the composite nitride may serve as both the negative active material and conducting agent, an additional conducting agent may be used in a reduced amount as compared with when using existing active materials.

The additional conducting agent is not particularly limited, and any suitable conducting agent having conductivity without causing chemical changes in the manufactured battery may be used.

The amount of the conducting agent may be from about 0.5 parts to about 5 parts by weight, and in some embodiments, may be from about 0.01 parts to about 3 parts by weight, based on 100 parts by weight of the composite nitride used as the negative active material.

When the amount of the conducting agent is within these ranges, a resulting negative electrode may have improved conductive characteristics.

The conducting agent may include at least one carbonaceous conducting agent selected from the group of, for example, carbon black, carbon fibers, and graphite. For example, the carbon black may be selected from the group of acetylene black, ketjen black, super P, channel black, furnace black, lamp black, and thermal black. The graphite may be natural graphite or artificial graphite.

The negative electrode may further include another conducting agent, in addition to the above-described carbonaceous conducting agent.

The additional conducting agent may be selected from the group of: conductive fibers, such as metal fibers; carbon fluoride powder; metal powder, such as aluminum powder, and nickel powder; conductive whiskers, such as zinc oxide and potassium titanate; conductive metal oxides, such as titanium oxide; and polyphenylene derivatives.

According to another embodiment, a lithium secondary battery including the above-described negative electrode is provided.

The negative electrode may contain a negative active material that includes a composite nitride of an LTO and a bronze-phase titanium oxide as described above, wherein the composite material may have an Li/Ti atomic ratio of from about 0.3 to about 1.8, and in some embodiments, from about 0.3 to about 1.4, and in some other embodiments, from about 0.33 to about 0.34.

As the negative active material of the negative electrode, an additional common negative active material for lithium secondary batteries may be used along with the above-described composite nitride.

Examples of the negative active material may include materials that allow intercalation and deintercalation of lithium ions, for example, graphite, carbonaceous materials such as carbon, lithium metal, lithium alloys, and silicon oxide-based materials.

The lithium secondary battery may have improvements in capacity, lifetime, and high-rate discharge characteristics.

The terms "high-rate discharge characteristics" may refer to a ratio of discharged capacity of a 100% fully-charged cell (100%) at a maximum discharge current within a predetermined time (for example, for less than 10 hours) to discharged capacity of the 100% fully-charged cell at the maximum discharge current just for the predetermined time (i.e., about 10 hours).

In some embodiments, the negative electrode may be manufactured as follows.

First, the composite nitride according to any of the embodiments, a binder, and a solvent may be mixed together to prepare a composition for forming a negative active material layer.

Optionally, at least one of a carbonaceous conducting agent and other conducting agents may be further added to the composition for forming a negative active material layer.

In preparing the composition for forming a negative active material layer, a common negative active material used in the art may be further added.

Examples of the common negative active material may include materials that allow intercalation and deintercalation of lithium ions, for example, graphite, carbonaceous materials such as carbon, lithium metal, lithium alloys, and silicon oxide-based materials.

Then, the composition for forming a negative active material layer may be coated on a negative current collector, and then be dried, so that the negative electrode is manufactured.

In general, the negative current collector may have a thickness of about 3 µm to about 500 µm. The negative electrode current collector is not particularly limited, and may include any suitable material that has an appropriate conductivity without causing chemical changes in the fabricated battery. Non-limiting examples of the negative electrode current collector may include copper, stainless steel, aluminum, nickel, titanium, thermal-treated carbon, copper or stainless steel that is surface-treated with carbon, nickel, titanium or silver, and aluminum-cadmium alloys. In addition, similar to the positive electrode current collector, the negative electrode current collector may be processed to have fine irregularities on a surface thereof so as to enhance the adhesive strength of the negative electrode current collector to the negative active material, and may be used in any of various forms, including a film, a sheet, a foil, a net, a porous structure, foam, and non-woven fabric.

Non-limiting examples of the solvent may include N-methylpyrrolidone (NMP), acetone, water, and mixtures thereof. The amount of the solvent may be from about 1 part to about 50 parts by weight based on 100 parts by weight of the negative active material. When the amount of the solvent is within this range, forming the negative active material layer may be facilitated.

According to an embodiment, a lithium secondary battery including the above-described negative electrode is provided. A method of manufacturing the lithium secondary battery, according to an embodiment, will now be described below.

Further to the negative electrode manufactured as described above, a positive electrode may be manufactured as follows.

As in the manufacturing process of the negative electrode described above, the positive electrode may be manufactured by coating a composition for forming a positive active material layer on a positive current collector, and drying the composition.

The composition for forming a positive active material layer may be prepared by mixing a positive active material, a conducting agent, a binder, and a solvent together.

For example, a lithium transition metal oxide that is commonly used as a positive active material for lithium batteries may be used as the positive active material.

The amounts of the conducting agent, binder, and solvent used in the positive electrode may be the same as those used in the negative electrode.

The lithium transition metal oxide may be at least one selected from the group of $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, and $a+b+c=1$), $LiNi_{1-y}Co_yO_2$, $LiCo_{1-y}Mn_yO_2$, $LiNi_{1-y}Mn_yO_2$ (wherein $0 \leq Y<1$), $LiMn_{2-z}Ni_zO_4$, $LiMn_{2-z}Co_zO_4$ (wherein $0<z<2$), $LiCoPO_4$, and $LiFePO_4$.

The positive electrode current collector may have a thickness of from about 3 μm to about 500 μm, and may be any current collector as long as it has high conductivity without causing chemical changes in the fabricated battery. Examples of the positive electrode current collector include stainless steel, aluminum, nickel, titanium, thermal-treated carbon, and aluminum or stainless steel that is surface-treated with carbon, nickel, titanium, or silver. The positive electrode current collector may be processed to have fine irregularities on a surface thereof so as to enhance an adhesive strength of the current collector to the positive active material. The positive electrode current collector may be in any of various forms, including a film, a sheet, a foil, a net, a porous structure, foam, and non-woven fabric.

A separator may be disposed between the positive and negative electrodes manufactured according to the processes described above, and then an organic electrolyte may be supplied thereto, thereby completing the manufacture of the lithium secondary battery.

In some embodiments, the negative electrode, the separator, and the positive electrode may be stacked upon one another to form a battery assembly, which may then be wound or folded. The battery assembly may then be encased in a cylindrical or rectangular battery case or in a pouch, followed by injection of an organic electrolyte solution thereinto, thereby completing the manufacture of the lithium second battery described above.

The separator may have a pore diameter of about 0.01 μm to about 10 μm and a thickness of about 5 μm to about 300 μm. Non-limiting examples of the separator are olefin-based polymers, such as polypropylene or polyethylene, a glass fiber sheet, and non-woven fabric.

The organic electrolyte solution may be a solution of a lithium salt in an organic solvent.

The organic solvent may be selected from the group of propylene carbonate, ethylene carbonate, fluoroethylene carbonate, butylene carbonate, dimethyl carbonate, diethyl carbonate, methyl ethyl carbonate, ethyl propyl carbonatemethyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl-1,3-dioxolane, N,N-dimethyl formamide, N,N-dimethylacetamide, N,N-dimethyl sulfoxide, 1,3-dioxane, 1,4-dioxane, 1,2-dimethoxyethane, sulforane, dichloroethane, chlorobenzene, nitrobenzene, diethylene glycol, dimethyl ether, and combinations thereof.

The lithium salt may be selected from the group of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, and combinations thereof.

In some other embodiments, the lithium secondary battery may further include an organic solid electrolyte and/or an inorganic solid electrolyte, along with the separator. When the organic solid electrolyte and/or inorganic solid electrolyte are used, they may serve also as a separator, and thus there may be no use of the above-described separator.

Non-limiting examples of the organic solid electrolyte may include polyethylene derivatives, polyethylene oxide derivatives, polypropylene oxide derivatives, phosphoric acid ester polymers, polyester sulfide, polyvinyl alcohols, and polyvinylidene fluoride.

Examples of the inorganic solid electrolyte may include nitrides, halides and sulfates of lithium such as $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

FIG. 1A illustrates a schematic perspective view of a lithium secondary battery 30 according to an embodiment.

Referring to FIG. 1A, the lithium secondary battery 30 may include an electrode assembly including a positive electrode 23, a negative electrode 22, and a separator 24 between the positive electrode 23 and the negative electrode 22. The electrode assembly may be contained within a battery case 25, and a sealing member 26 may seal the battery case 25. An electrolyte (not shown) may be injected into the battery case 25 to impregnate the electrode assembly. The lithium secondary battery 30 may be manufactured by sequentially stacking the positive electrode 23, the negative electrode 22, and the separator 24 on one another to form a stack, winding the stack, and inserting the rolled up stack into the battery case 25.

The negative electrode 22 may include the composite nitride described above as a negative active material.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Preparation Example 1

Preparation of Bronze-Phase TiO2

6 g of anatase $TiO_2$, and 28 mL of deionized water were mixed with a 15 M NaOH aqueous solution in adequate amount in an autoclave, and were maintained at about 170° C. for about 72 hours for hydrothermal synthesis reaction.

2 g of the reaction product was added to 50 mL of a 0.05 M hydrochloric acid (HCl) aqueous solution and stirred for about 3 hours, followed by filtration.

The resulting product was dried at about 80° C. for about 15 hours and was then thermally treated at about 350° C. for about 4 hours to obtain bronze-phase $TiO_2$.

Preparation Example 2

Preparation of Bronze-Phase $TiO_2$ ("$TiO_2$—B") Nanowires

First, a 15 M NaOH aqueous solution in adequate amount and anatase $TiO_2$ powder were put in an autoclave and were maintained at about 170° C. for 72 hours for hydrothermal synthesis. As a result of the hydrothermal synthesis, sodium titanate ($Na_2Ti_3O_7$) was obtained.

A 1 M HCl aqueous solution was added to the sodium titanate, and stirred at room temperature and then at a high temperature of about 50° C. for about 6 hours in total for proton exchange reaction, thereby preparing hydrogen titanate ($H_2Ti_3O_7$), which was then thermally treated in the air at about 300-400° C. for about 3-7 hours, thereby obtaining $TiO_2$—B nanowires.

Example 1

Preparation of Composite Nitride

Bronze-phase $TiO_2$ was put in a quartz reaction tube and was then thermal-treated in a nitrogen atmosphere at about 300° C. Ammonia gas was flowed into the quartz reaction tube for about 3 hours to react with the bronze-phase $TiO_2$ and form a composite nitride.

The composite nitride was $TiO_xN_yH_z$ (where x=1.99, y=0.01, and z=0), and had an average particle diameter of about 100 nm. A nitrogen doping depth of the composite nitride was about 2% of the average particle diameter.

Example 2

Preparation of Composite Nitride

A composite nitride was prepared in the same manner as in Example 1, except that the thermal treatment of the bronze-phase $TiO_2$ was performed at about 400° C.

Example 3

Preparation of LTO (Li4Ti5O12)

1.2876 g of $Li_2CO_3$ and 1.7397 g of $TiO_2$ were mixed together for about 30 minutes using a ball mill. After being spray-dried, the resulting mixture was thermally treated in the air at about 850° C. for about 5 hours to obtain $Li_4Ti_5O_{12}$ (hereinafter, "LTO") powder.

The LTO (hereinafter, "LTO(A)") obtained above had an average particle diameter (D50) of about 22.964 μm.

Also, an LTO (hereinafter, "LTO(B)") was prepared in the same manner as in LTO(A) except for omitting the spray-drying. The LTO(B) had an average particle diameter (D50) of about 0.685 μm.

Example 4

Preparation of Composite Nitride

The LTO(B) of Example 3 and the bronze-phase $TiO_2$ nanowires of Preparation Example 2 were mixed in a ratio of about 7:3 by weight to obtain a mixture, which was then thermally treated at about 300-400° C., thereby preparing a composite material.

The composite material was put in a reaction vessel and was then heated at about 30° C. in a nitrogen atmosphere. Ammonia gas was flowed into the reaction vessel for about 3 hours to react with the bronze-phase $TiO_2$ and form a composite nitride.

The composite nitride was $Li_xTiO_yN_zH_u$ (x=0.33, y=2.32, z=0.01, and u=0) and had an average particle diameter of about 1,000 nm. A nitrogen doping depth of the composite nitride was about 2% of the average particle diameter.

An amount of LTO in the composite nitride was about 0.41 moles based on 1 mole of the bronze-phase $TiO_2$.

Example 5

Preparation of Composite Nitride

A composite nitride was prepared in the same manner as in Preparation Example 4, except that the LTO(B) of Example 3 and the bronze-phase $TiO_2$ nanowires of Preparation Example 2 were mixed in a ratio of about 8:2 by weight.

A concentration of LTO(B) in the composite nitride was about 0.70 moles based on 1 mole of the bronze-phase $TiO_2$.

Example 6

Preparation of Composite Nitride

A composite nitride was prepared in the same manner as in Preparation Example 4, except that the LTO(B) of Example 3 and the bronze-phase $TiO_2$ nanowires of Preparation Example 2 were mixed in a ratio of about 6:4 by weight.

An amount of LTO(B) in the composite nitride was about 0.26 moles based on 1 mole of the bronze-phase $TiO_2$.

Manufacture Example 1

Manufacture of Negative Electrode and Coin Cell 94 g of the composite nitride of Example 1, 3 g of PVDF, 3 g of a carbon black, and 20 mL of NNMP were mixed together and mechanically stirred to prepare a slurry.

Subsequently, the slurry was coated on an Al foil to a thickness of about 90 μm and was then vacuum-dried at about 120° C. to form a negative electrode.

The negative electrode was rolled up into a roll form with a diameter of about 12 mm, and was then assembled along with a lithium metal counter electrode to manufacture a CR2032 coin cell. A solution of 1.1 M $LiPF_6$ or 0.2 M $LiBF_4$ in a mixed solvent of ethylene carbonate and methyl ethyl carbonate in 3:7 by volume was used as an electrolyte solution.

Manufacture Example 2

Manufacture of Negative Electrode and Coin Cell

A negative electrode and a coin cell were manufactured in the same manner as in Manufacture Example 1, except that the composite nitride of Example 2, instead of the composite nitride of Example 1, was used.

Manufacture Example 3

Manufacture of Negative Electrode and Coin Cell

A negative electrode and a coin cell were manufactured in the same manner as in Manufacture Example 1, except that the composite nitride of Example 4, instead of the composite nitride of Example 1, was used.

Manufacture Example 4

Manufacture of Negative Electrode and Coin Cell

A negative electrode and a coin cell were manufactured in the same manner as in Manufacture Example 1, except that the composite nitride of Example 5, instead of the composite nitride of Example 1, was used.

Comparative Manufacture Example 1

Manufacture of Negative Electrode and Coin Cell

A negative electrode and a coin cell were manufactured in the same manner as in Manufacture Example 1, except that bronze-phase $TiO_2$ of Preparation Example 1 instead of the composite nitride of Example 1, was used.

Comparative Manufacture Example 2

Manufacture of Negative Electrode and Coin Cell

A negative electrode and a coin cell were manufactured in the same manner as in Manufacture Example 3, except that a mixture of LTO(B) prepared by Example 3 and anatase $TiO_2$ in 7:3 by weight, instead of the composite nitride of Example 1, was used.

Figure 1B:
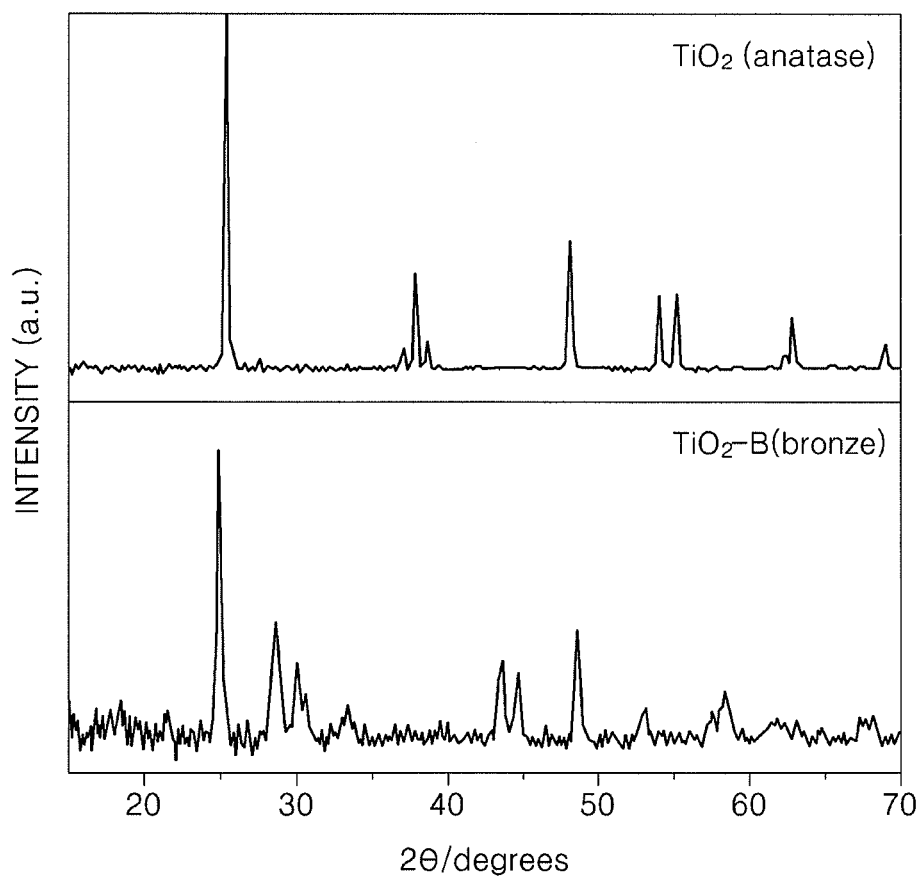
FIG. 1B illustrates X-ray diffraction (XRD) spectra of anatase titanium oxide and bronze-phase titanium oxide.
Figure 2:
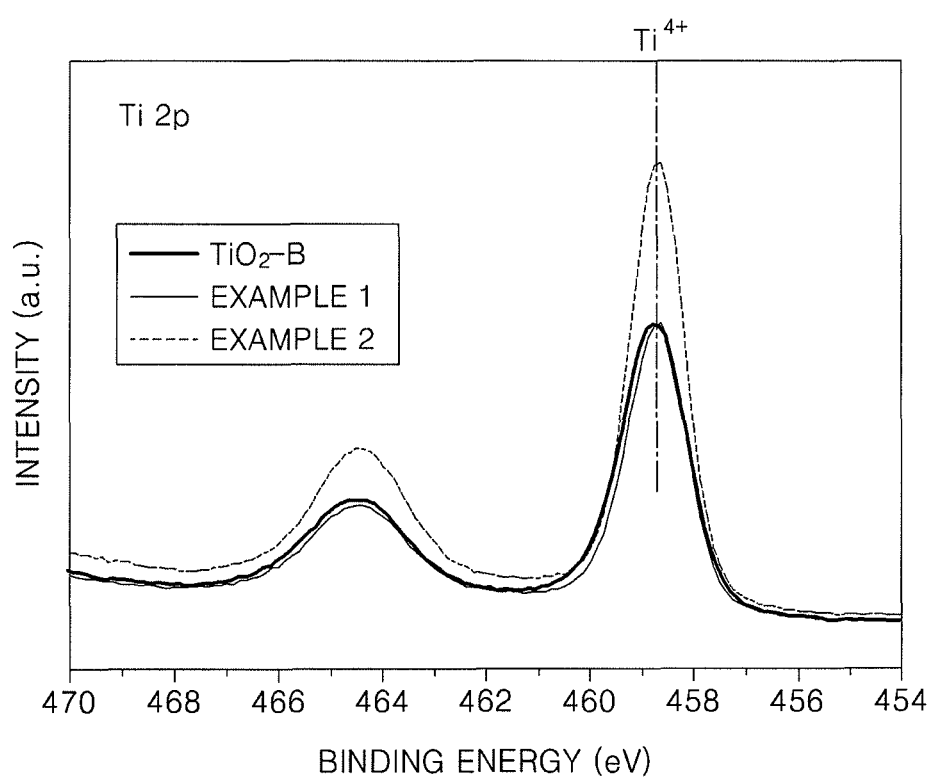
FIGS. 2 and 3 illustrate X-ray photoelectron spectroscopic (XPS) spectra of composite nitrides of Examples 1 and 2.
Figure 3:
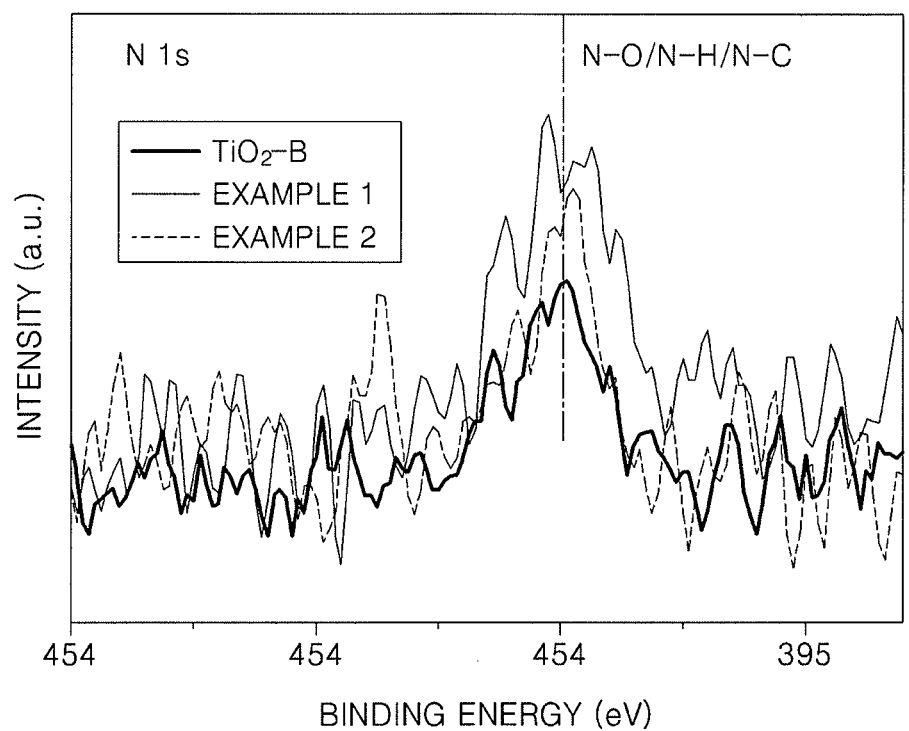
Figure 4:
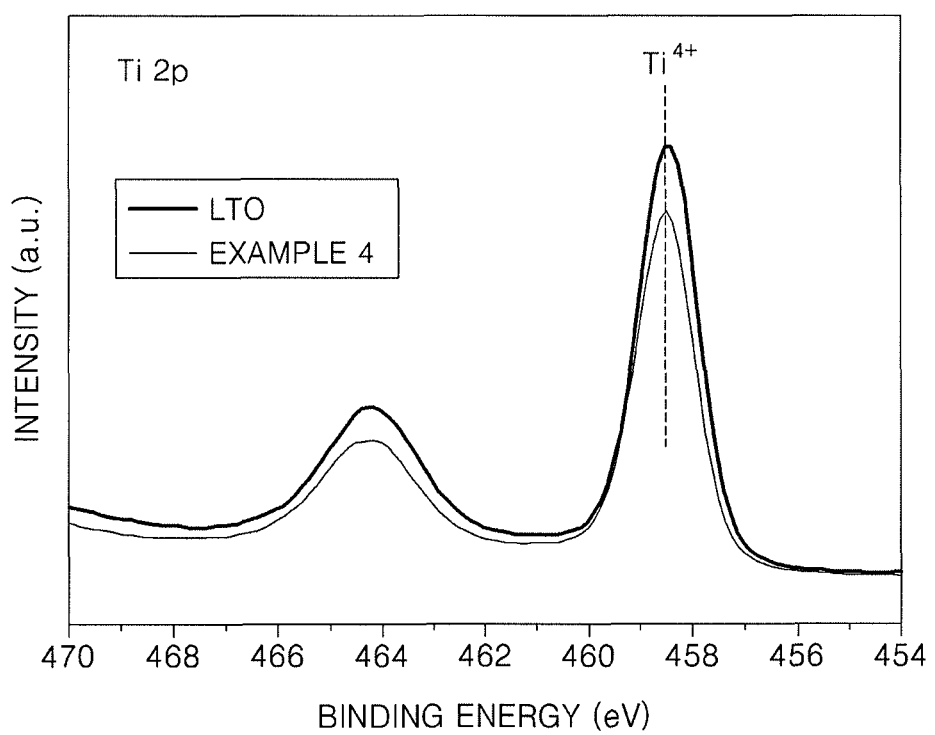
FIGS. 4 and 5 illustrate XPS spectra of lithium titanium oxide and a composite nitride of Example 4.
Figure 5:
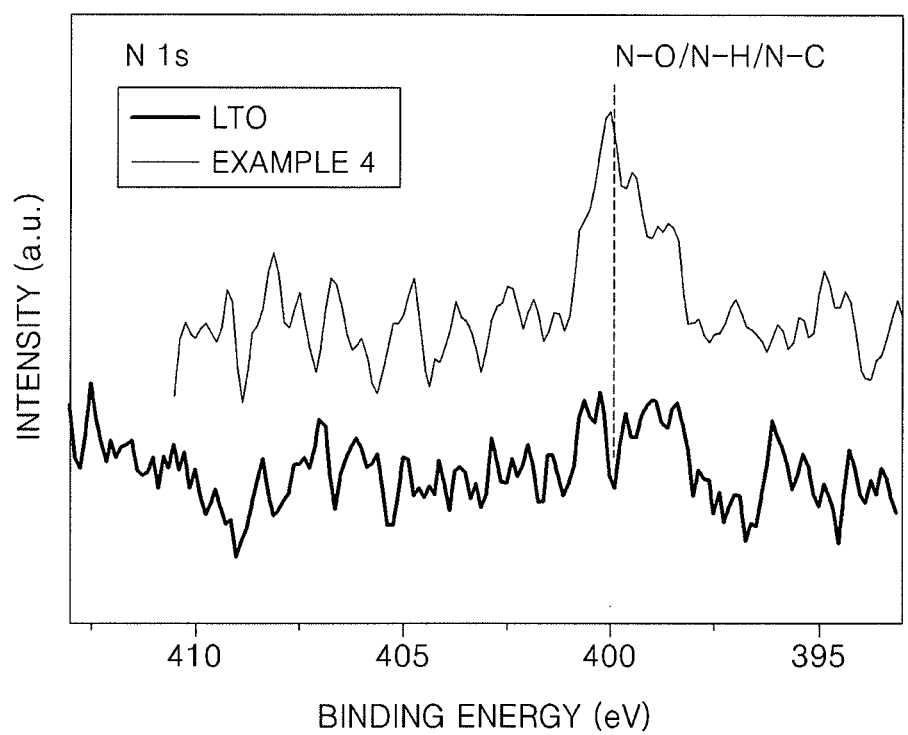
Figure 6:
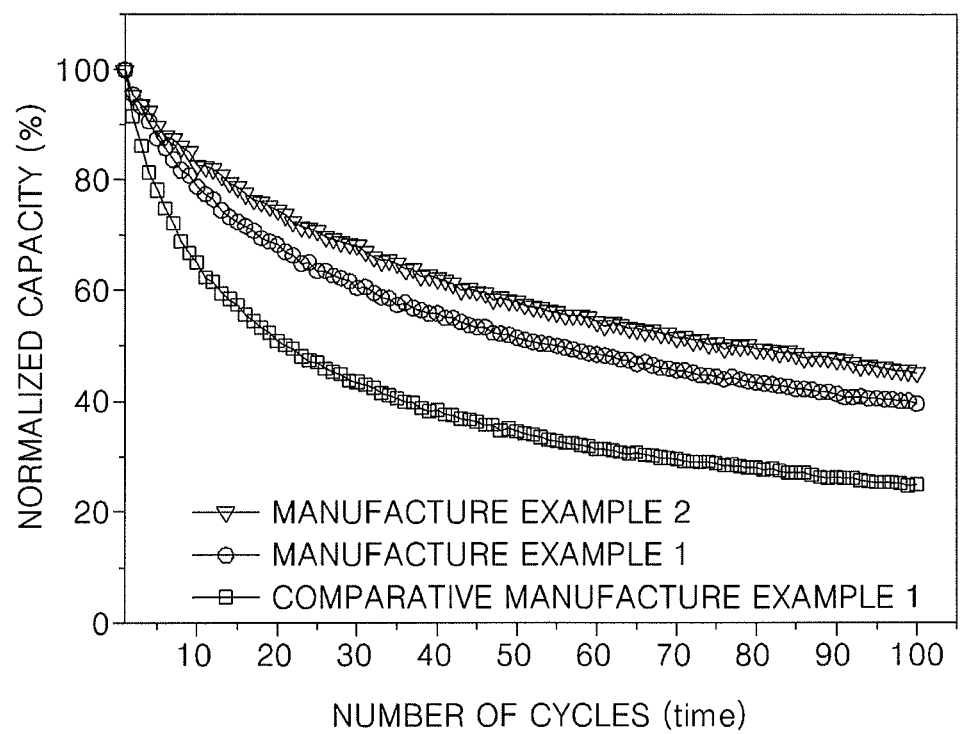
FIG. 6 illustrates a graph showing lifetime characteristics of lithium secondary batteries of Manufacture Examples 1 and 2 and Comparative Manufacture Example 1.
Figure 7:
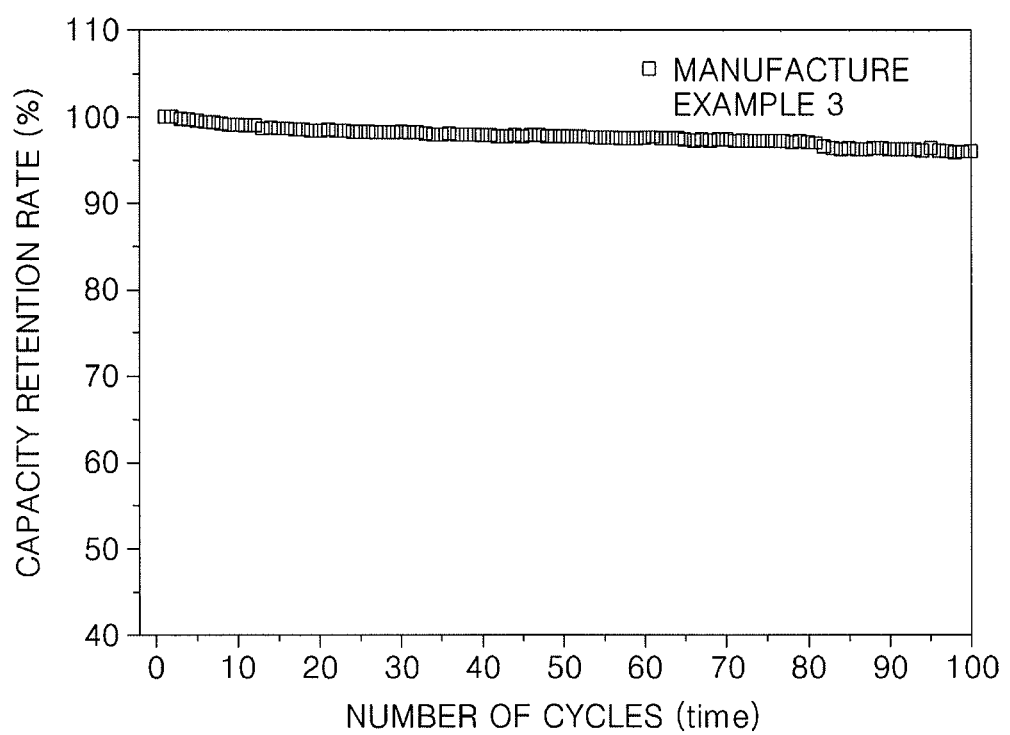
FIG. 7 illustrates a graph showing lifetime characteristics of a lithium secondary battery of Manufacture Example 3.
Figure 8:
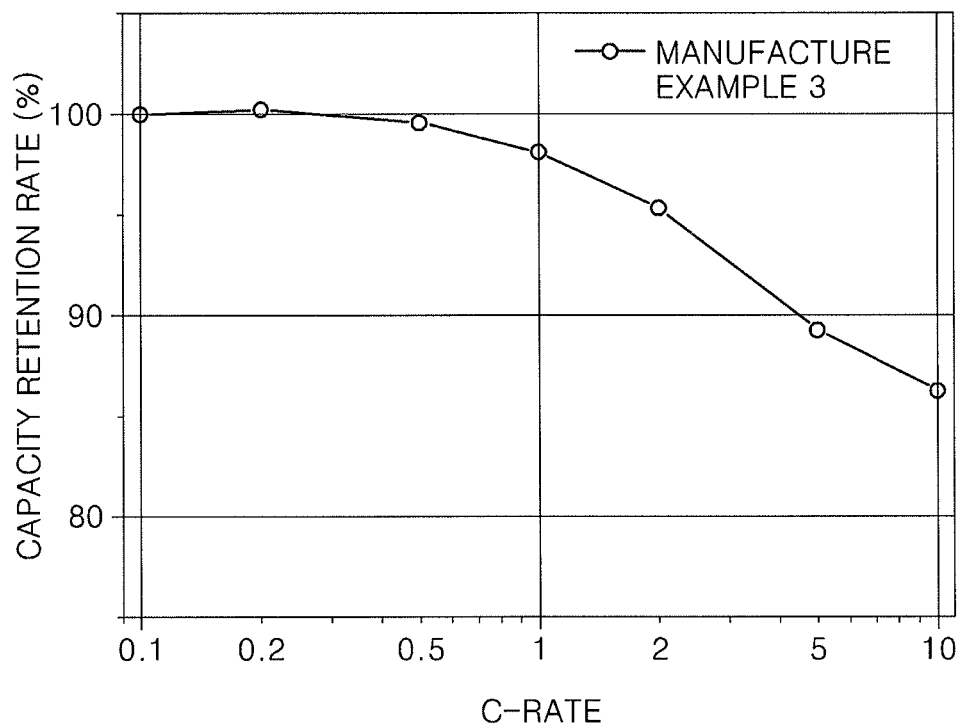
FIG. 8 illustrates a graph showing high-rate discharge characteristics of the lithium secondary battery of Manufacture Example 3.

FIG. 1B illustrates X-ray diffraction (XRD) spectra of anatase titanium oxide and bronze-phase titanium oxide. FIGS. 2 and 3 illustrate X-ray photoelectron spectroscopic (XPS) spectra of composite nitrides of Examples 1 and 2. FIGS. 4 and 5 illustrate XPS spectra of lithium titanium oxide and a composite nitride of Example 4. FIG. 6 illustrates a graph showing lifetime characteristics of lithium secondary batteries of Manufacture Examples 1 and 2 and Comparative Manufacture Example 1. FIG. 7 illustrates a graph showing lifetime characteristics of a lithium secondary battery of Manufacture Example 3. FIG. 8 illustrates a graph showing high-rate discharge characteristics of the lithium secondary battery of Manufacture Example 3.

EVALUATION EXAMPLES

Evaluation Example 1

X-Ray Diffraction (XRD) Analysis

1) XRD Spectrum of Composite Material

X-ray diffraction spectra of the composite nitrides of Examples 4, 5, and 6 were observed, and an intensity ratio of a bronze-phase titanium oxide ($TiO_2$—B) main peak with a Bragg angle 2θ of about 23~27° to an LTO(B) main peak with a Bragg angle 2θ of about 17~19° for each composite material was analyzed. The results are in Table 1 below.

TABLE 1

| Example | Electrode composition (LTO(B)/ TiO2—B by weight) | LTO- main peak intensity (counts) | TB (nanowire)- main peak intensity (counts) | I NW-TB/I LTO |
|---|---|---|---|---|
| Example 4 | 7:3 | 542 | 30 | 0.055 |
| Example 5 | 8:2 | 574 | 27 | 0.047 |
| Example 6 | 6:4 | 507 | 49 | 0.097 |

In Table 1 above, $I_{NW-TB}$ and $I_{LTO}$ indicate $1^{st}$ main peak intensities of $TiO_2$—B nanowires)(2θ=23~27° and LTO(B) (2θ=17~19°, respectively.

2) XRD Spectra of Bronze-Phase Titanium Oxide and Anatase Titanium Oxide

For comparison between the XRD spectra of the composite materials of Examples 4, 5, and 6, XRD spectra of anatase titanium oxide (TiO2) and bronze-phase titanium oxide ($TiO_2$—B) are presented in FIG. 1B.

Main peaks of anatase titanium oxide appeared at near 25.0~25.5° (relative intensity: 100%) and 47.5~48.0° (relative intensity: 22%).

Evaluation Example 2

XXPS Analysis

The composite nitride of Example 1 and the bronze-phase titanium oxide ($TiO_2$—B) of Preparation Example 2 were analyzed using XPS. The results are shown in FIGS. 2 and 3. The composite nitride of Example 4 and the LTO(B) ($Li_4Ti_5O_{12}$) of Example 3 were analyzed using XPS. The results are shown in FIGS. 4 and 5. The XPS measurement was carried out using a system (Model no. Q2000, available from PHI) and a monochromatic Al Kα X-ray radiation with an energy of 1486.6 eV as an X-ray source.

Referring to FIGS. 2 and 4, the composite nitrides of Examples 1, 2, and 4 were found to each have main peaks at a binding energy of about 457-461 eV and at a binding energy of about 463-467 eV, which correspond to peaks of a binding energy of titanium in the 2p orbital.

Referring to FIGS. 3 and 5, the composite nitrides of Examples 1, 2, and 4 were found to each have a main peak at a binding energy of about 397-402 eV, which corresponds to a peak of a binding energy of nitrogen in the 1s orbital. This supports or indicates the presence of nitrogen on surfaces of the composite nitrides.

A relative atomic concentration of each element in the composite nitrides of Examples 1-4 was calculated from the areas of corresponding peaks in the XPS spectra of Examples 1-4 and the bronze-phase titanium oxide. The results are shown in Table 2 below.

TABLE 2

| Example | Li(1s) | C(1s) | N(1s) | O(1s) | Ti(2p) |
|---|---|---|---|---|---|
| Example 1 | — | 26.13 | 0.41 | 52.49 | 20.97 |
| Example 2 | — | 28.52 | 0.44 | 50.60 | 20.44 |
| Example 4 | 6.36 | 17.00 | 0.26 | 55.74 | 20.64 |
| Example 3 (LTO) | 14.38 | 12.23 | — | 54.65 | 18.75 |
| $TiO_2$—B | — | 27.71 | 0.27 | 51.26 | 20.76 |

Evaluation Example 3

Evaluation of Initial Discharge Capacity and Lifetime Characteristics

Initial discharge capacity and lifetime characteristics of the coin cells of Manufacture Examples 1 and 2 and Comparative Manufacture Example 2 were evaluated. The results are shown in FIG. 6 and Table 2. Charge/discharge characteristics of each coin cell were evaluated using a charging/discharging apparatus (Model no. TOYO-3100, available from TOYO).

The coin cells of Manufacture Examples 1 and 2 and Comparative Manufacture Example 1 were each charged at a current of 0.1 C rate in the first cycle until the voltage of the cell reached 1.0 V, and were then charged at a constant voltage of 1.0 V at a cut-off current of 0.01 C. After a rest period of about 10 minutes, each coin cell was discharged at a 0.1 C rate to a cut-off voltage of 2.5 V, followed by measurement of discharge capacity. The LTO had a density of about 3.48 g/cc, and the $TiO_2$—B nanowires had a density of about 3.73 g/cc. The "C" used herein may refer to a cell discharge rate, which is obtained by division of a total capacity of a cell by a total of discharge hours.

After hundred repetitions of the charge/discharge cycle, changes in normalized capacity with respect to the number of cycles were measured, and the capacity retention rate of each cell was calculated therefrom. The results are shown in Table 3, below, and FIG. 6. From the second cycle, charge/discharge cycle characteristics were measured at a 1 C rate. A rest period and voltage ranges for each cycle from the second cycle were adjusted to be the same as those in the first cycle.

TABLE 3

| Example | Initial discharge capacity (mAh/g) | Capacity retention rate (%) (@100 cycle, 1 C) |
|---|---|---|
| Manufacture Example 1 | 265 | 39.5 |
| Manufacture Example 2 | 254 | 45.2 |
| Comparative Manufacture Example 1 | 247 | 24.9 |

Referring to Table 3 and FIG. 6, the coin cells of Manufacture Examples 1 and 2 were found to each have improved initial discharge capacity and capacity retention rate as compared with those of the coin cell of Comparative Manufacture Example 1.

Two-hundred charge and discharge cycles were performed on the coin cells of Manufacture Examples 3-4 and Comparative Manufacture Example 2, each cycle consisting of charging at a constant current of 1 C and a constant voltage of 1.0 V (0.01 C cut-off), a rest for about 10 minutes, and discharging at a constant current of 1 C (at room temperature (20° C.) and a 2.5 V cut-off).

Lifetime characteristics of each coin cell were evaluated from changes in normalized capacity with respect to the number of cycles, and capacity retention rates were calculated therefrom using Equation 1 below. The results are shown in FIG. 7 and Table 4, below.

Capacity retention rate(%)=(Discharge capacity of cell at a discharge rate of 1 C/(Discharge capacity of cell at a discharge rate of 0.1 C)*100   [Equation 1]

TABLE 4

| Example | Initial discharge capacity (mAh/g) | Capacity retention rate (%) (@100 cycle, 1 C) |
|---|---|---|
| Manufacture Example 3 | 191 | 92.0 |
| Manufacture Example 4 | — | 91.8% |
| Comparative Manufacture Example 2 | 178 | 84.0 |

Referring to Table 4 and FIG. 7, the coin cell of Manufacture Example 3 was found to have an improved initial discharge capacity and capacity retention rate as compared with those of the coin cell of Comparative Manufacture Example 2. The coin cell of Manufacture Example 4 had an improved capacity retention rate as compared with that of the coin cell of Comparative Manufacture Example 2.

Evaluation Example 4

High-Rate Charge/Discharge Test

The coin cells of Manufacture Example 3 and Comparative Manufacture Example 2 were each charged at a constant current of 0.1 C and a constant voltage of 1.0 V (0.01 C cut-off). After a rest for about 10 minutes, each coin cell was discharged at a constant current of 0.1 C, 0.2 C, 0.5 C, 1 C, 2 C, 5 C, or 10 C and a 2.5 V cut-off. The charge and discharge rates were varied as shown in Table 5, below, and high-rate discharge characteristics of each cell were evaluated. The results are shown in Table 5 and FIG. 8.

The high-rate discharge characteristics in Table 5 were calculated using Equation 2 below.

High-rate discharge characteristic(%)=(Discharge capacity of cell at a discharge rate of 1 C or 10 C)/(Discharge capacity of cell at a discharge rate of 0.2 C or 1 C)*100   [Equation 2]

TABLE 5

| Example | High-rate discharge characteristic (1 C/0.2 C)(%) | High-rate discharge characteristic (10 C/1 C)(%) |
|---|---|---|
| Manufacture Example 3 | 97.9 | 87.9 |
| Comparative Manufacture Example 2 | 95.2 | 81.6 |

Referring to Table 5 and FIG. 8, the coin cell of Manufacture Example 3 was found to have improved high-rate discharge characteristics as compared with those of the coin cell of Comparative Manufacture Example 2. Improved high-rate discharge characteristics means that a reduction rate of normalized capacity (i.e., capacity retention rate) becomes low with an increased discharge rate (C-rate).

By way of summation and review, some negative active materials may not be satisfactory in high-rate discharge characteristics and lifetime characteristics.

As described above, by using a composite nitride according to any of the above embodiments as an electrode active material, a lithium secondary battery with improved high-rate and lifetime characteristics may be manufactured.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composite nitride, comprising:
a core material including a bronze-phase titanium oxide; and
a nitrogen atom doped on at least part of the core material,
wherein the composite nitride is formed by thermally treating a core material including a bronze-phase titanium oxide in contact with a nitrogen precursor gas at a temperature of about 300° C. to about 400° C.

2. The composite nitride as claimed in claim 1, wherein the composite nitride is a compound represented by Formula 1, below:

$$TiO_xN_yH_z \qquad \text{[Formula 1]}$$

wherein, in Formula, $1.0 \le x \le 2.0$, $0 < y \le 1.0$, and $0 \le z \le 1.0$.

3. The composite nitride of claim 1, wherein the bronze-phase titanium oxide is a compound represented by Formula 2 below:

$$Ti_{1+x}O_{2+y} \qquad \text{[Formula 2]}$$

wherein, in Formula 2, $-0.2 \le x \le 0.2$ and $-0.2 \le y \le 0.2$.

4. The composite nitride as claimed in claim 1, wherein:
the core material further includes a lithium titanium oxide, and
the core material is a composite material of the bronze-phase titanium oxide and the lithium titanium oxide.

5. The composite nitride as claimed in claim 4, wherein the composite nitride is a compound represented by Formula 3 below:

$$Li_xTiO_yN_zH_u \qquad \text{[Formula 3]}$$

wherein, in Formula 3, $0 < x \le 2.0$, $1.0 \le y \le 2.5$, $0 < z \le 1.0$, and $0 \le u \le 1.0$.

6. The composite nitride as claimed in claim 4, wherein the lithium titanium oxide is a compound represented by Formula 4 below:

$$Li_{4+a}Ti_{5-b}M_cO_{12-d} \qquad \text{[Formula 4]}$$

wherein, in Formula 4, $-0.2 \le a \le 0.2$, $-0.3 \le b \le 0.3$, $0 \le c \le 0.3$, and $-0.3 \le d \le 0.3$; and
M is at least one selected from among metals of Groups 1-6, Group 8, and Groups 12-15 of the periodic table of elements.

7. The composite nitride as claimed in claim 6, wherein M in Formula 4 is at least one selected from the group of lithium (Li), sodium (Na), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As).

8. The composite nitride as claimed in claim 4, wherein the composite material of the bronze-phase titanium oxide and the lithium titanium oxide has an atomic ratio of lithium to titanium of about from 0.3 to about 1.8.

9. The composite nitride as claimed in claim 1, wherein:
an X-ray photoelectron spectrum (XPS) of the composite nitride includes a nitrogen peak with a binding energy of from about 397 eV to about 402 eV and a titanium peak with a binding energy of from about 457 eV to about 461 eV and from about 463 eV to about 467 eV, and
a composition ratio of nitrogen to titanium that is calculated from areas of the nitrogen peak with the binding energy of from about 397 eV to about 402 eV and the titanium peak with the binding energy of from about 457 eV to about 461 eV is from about 1:220 to about 1:350.

10. The composite nitride as claimed in claim 1, wherein:
an X-ray photoelectron spectrum (XPS) of the composite nitride includes a nitrogen peak with a binding energy of from about 397 eV to about 402 eV, and an oxygen peak with a binding energy of from about 529 eV to about 532 eV, and
a composition ratio of nitrogen to oxygen that is calculated from areas of the nitrogen peak and the oxygen peak is from about 1:140 to about 1:150.

11. The composite nitride as claimed in claim 1, wherein an X-ray diffraction spectrum of the composite nitride with a CuK-α X-ray wavelength of 1.541 Å includes a peak with a Bragg angle 2θ of from about 23° to about 27°.

12. The composite nitride as claimed in claim 1, wherein the composite nitride is a compound represented by $TiO_xN_yH_z$ (x=1.98, y=0.01, and z=0.01), a compound represented by $TiO_xN_yH_z$ (x=1.99, y=0.01, and z=0), a compound represented by $Li_xTiO_yN_zH_u$ (x=0.33, y=2.23, z=0.05, and u=0.05), or a compound represented by $Li_xTiO_yN_zH_u$ (x=0.33, y=2.32, z=0.01, and u=0).

13. An electrode active material comprising the composite nitride as claimed in claim 1.

14. An electrode comprising the electrode active material as claimed in claim 13.

15. A lithium secondary battery comprising the electrode as claimed in claim 14.

16. A method of preparing a composite nitride, the method comprising thermally treating a core material including a bronze-phase titanium oxide in contact with a nitrogen precursor gas at a temperature of about 300° C. to about 400° C.

17. The method as claimed in claim 16, wherein:
the core material further includes a lithium titanium oxide, and
the core material is a composite material of the bronze-phase titanium oxide and the lithium titanium oxide.

18. The method as claimed in claim 17, wherein the composite material of the bronze-phase titanium nitride and the lithium titanium oxide is prepared by:
mixing the bronze-phase titanium nitride and the lithium titanium oxide to obtain a mixture; and
thermally treating the mixture.

19. The method as claimed in claim 17, wherein the lithium titanium oxide is included in an amount of from about 0.01 moles to about 99 moles, based on 1 mole of the bronze-phase titanium oxide.

20. The method as claimed in claim 16, wherein the bronze-phase titanium oxide is prepared by:
- mixing anatase $TiO_2$ and a 10 M to 18 M sodium hydroxide aqueous solution to form a mixture,
- performing a hydrothermal synthesis reaction on the mixture at a temperature of about 150° C. to about 180° C. to form a sodium titanate,
- subjecting the sodium titanate to a proton exchange reaction in an acidic solution to form hydrogen titanate,
- thermally treating the hydrogen titanate under an air or oxygen atmosphere at about 300° C. to about 400° C. for about 3 to about 7 hours.

* * * * *